United States Patent [19]

Schaefer et al.

[11] Patent Number: 4,484,021
[45] Date of Patent: Nov. 20, 1984

[54] ELECTRICAL OUTLET SEAL

[75] Inventors: Hermann Schaefer, Bridgeport; Ernest G. Hoffman, Middlefield, both of Conn.

[73] Assignee: Harvey Hubbell Incorporated, Orange, Conn.

[21] Appl. No.: 411,688

[22] Filed: Aug. 26, 1982

[51] Int. Cl.³ .............................................. H02G 3/18
[52] U.S. Cl. ...................................... 174/53; 174/67; 339/94 A
[58] Field of Search .......................... 174/53, 66, 67; 220/241, 242; 339/44 R, 44 M, 94 R, 94 A

[56] References Cited

U.S. PATENT DOCUMENTS

| | | | |
|---|---|---|---|
| 1,176,515 | 3/1916 | Bissell et al. | 339/139 C |
| 1,366,246 | 1/1921 | Cooper | 339/44 R |
| 2,304,870 | 12/1942 | Yost | 339/44 R |
| 2,705,308 | 3/1955 | Howard | 339/94 L |
| 2,728,894 | 12/1955 | Peters | 339/44 R X |
| 3,066,272 | 11/1962 | Quackenbush | 339/60 R |
| 4,058,358 | 11/1977 | Carlisle | 339/44 M |

OTHER PUBLICATIONS

Reader's Digest Complete Do-It-Yourself Manual, p. 272, Nov., 1978.

Primary Examiner—John F. Gonzales
Assistant Examiner—D. A. Tone
Attorney, Agent, or Firm—Jerry M. Presson

[57] ABSTRACT

A resilient gasket for a weatherproof electrical outlet provides seals between the outlet box and the cover plate, between the receptacle and the cover plate, and between the cover plate and cover flap or plug connected to the receptacle. The gasket is a planar member having a peripheral configuration corresponding to the peripheral configurations of a standard outlet box and cover plate therefor and is received between the cover plate and receptacle and between the cover plate and outlet box. At least one aperture extends through the gasket and has transverse dimensions, in a relaxed condition of the gasket, less than the similar dimensions of projections on standard electrical receptacles. Upon assembly of the gasket within the electrical outlet, the portions of the gasket adjacent the aperture are stretched and deformed out of the plane of the gasket to provide a peripheral lip which extends through the cover plate opening, surrounds the receptacle projection, and contacts the cover flap in its closed position or the plug connected to the receptacle. In this manner, a single, unitary and continuous gasket is provided for the electrical outlet.

28 Claims, 7 Drawing Figures

ELECTRICAL OUTLET SEAL

FIELD OF THE INVENTION

The present invention relates to a gasket for sealing an electrical outlet, which gasket is unitary and continuous. More particularly, the present invention relates to an improved gasket for a weatherproof outlet box and cover plate which forms seals between the box, cover plate, electrical receptacle and flaps on the cover plate, and with most electrical plugs connected to the receptacle.

BACKGROUND OF THE INVENTION

Conventional electrical outlets for outdoor use include a receptacle housed in a weatherproof outlet box which is closed by a weatherproof cover plate. For duplex outlets, the cover plate commonly has two openings and two flaps are mounted adjacent the openings. The flaps are hingedly mounted on the cover for movement between open and closed positions relative to the openings, and are spring biased towards their closed positions. The openings in the cover plate permit access to the contacts in the receptacle, while the flaps individually control that access.

Conventionally, a rubber gasket which overlies the electrical receptacle has been mounted between the cover plate and outlet box. This gasket has a single rectangular opening larger than or has two separate openings with transverse dimensions substantially equal to the transverse dimensions of the standard projections surrounding the contacts on the outlets such that this gasket merely provides seals between the outlet box and the cover plate. It does not provide seals with the cover plate flaps nor does it seal between the receptacle and cut-out openings in the cover plate. Thus, conventional outlets of this type require the use of separate gaskets or seals for the cover flaps and do not seal against an electrical plug connected to the receptacle.

The use of separate seals for the cover flaps results in increased manufacturing and assembly costs. Additionally, these separate seals increase the likelihood of leakage of contamination into the outlet box and into the receptacle, causing damage to and shorting of the electrical components. Moreover, the seal between the cover plate and the receptacle is susceptible to leakage in the conventional seal arrangement.

U.S. Pat. No. 4,058,358 to Carlisle discloses a one-piece, molded gasket, formed of rubber, for a covered electrical outlet box. The patent asserts that the gasket provides seals between the outlet box and cover plate, between the cover plate and receptacle, between the cover plate and the cover flap when the flap is closed and between the receptacle and a mating plug when the flap is opened (column 1, lines 6-12). However, the configuration of this gasket is complex, making the gasket difficult and expensive to manufacture, particularly by molding. Additionally, such molded gasket does not provide adequate seals between the cover plate and receptacle and with the mating plug. For a duplex outlet, the cover plate disclosed in the Carlisle patent has a single, large opening receiving the gasket projection and both receptacle projections, such that there is no central cover plate portion by which a single, centrally located screw can secure the cover plate to the receptacle, and thereby to the outlet box.

SUMMARY OF THE INVENTION

It has now been found that the gasket for an electrical outlet should be formed such that a single, unitary and continuous gasket will effectively form seals for the entire assembly between the outlet box, cover plate, receptacle and cover flaps or plugs from the elements, such as rain. This single, unitary and continuous gasket facilitates manufacture and assembly of the outlet, as well as enhancing the weatherproof characteristics of the outlet.

Accordingly, an object of the present invention is to provide an improved housing for an electrical outlet including a gasket which effectively protects the electrical receptacle from damage by the environment.

Another object of the present invention is to provide a gasket for an electrical outlet which is formed of a single, unitary and continuous member and which effectively forms the seals between the outlet box, receptacle, cover plate and cover flaps or plugs.

A further object of the present invention is to provide an electrical outlet and a gasket for an electrical outlet which is of rugged construction and which is simple and inexpensive to manufacture, install and replace.

A still further object of the present invention is to provide an electrical outlet with a gasket which effectively forms seals between the outlet box, receptacle, cover plate and cover flaps or plugs, and which permits the cover plate to be secured to the receptacle, and thereby to the outlet box, by a single screw passing through central openings in the cover plate and gasket and threaded in a central bore in the receptacle.

The foregoing objects are basically attained by an electrical outlet comprising an outlet box, electrical receptacle having a projection, cover plate and gasket. The electrical receptacle is mounted in the outlet box and is covered by the cover plate extending over the receptacle and coupled to the box. The cover plate has a first opening exposing the receptacle and receiving the receptacle projection, and a first flap coupled to the cover plate, positioned over the opening and movable between open and closed positions. The gasket is unitary and continuous, is received between the cover plate and receptacle and between the cover plate and outlet box, and is a generally planar member of resilient material. The planar member has a peripheral configuration corresponding to the peripheral configurations of the outlet box and cover plate and has an aperture extending through it. The gasket aperture has transverse dimensions less than the transverse dimensions of the receptacle projection such that when the gasket is fully assembled with the other outlet components, portions of the gasket adjacent its aperture are stretched and deformed out of the plane of the gasket to form a peripheral lip surrounding the aperture and receptacle projection, extending through the cover plate opening and contacting the flap when in its closed position or a plug when connected to the receptacle provided the plug is of the appropriate size and configuration.

The foregoing objects are also basically obtained by providing a unitary, continuous gasket for sealing an electrical outlet, comprising a generally planar member with first and second apertures extending through it. The peripheral configuration of the planar member corresponds to the peripheral configurations of standard duplex outlet boxes and cover plates therefor. The apertures have transverse dimensions (i.e., dimensions in the plane of the gasket) in a relaxed condition which are less than the transverse dimensions of the projections for the electrically conductive contacts in standard duplex electrical receptacles.

By forming the gasket of the present invention in this manner, separate seals for the cover flaps of conventional outlets are unnecessary and plugs are sealed to the receptacle upon connection. The gasket of the present invention forms tight seals between the box and the cover plate, between the receptacle and the cover plate and between the flap or flaps or plug and the cover plate. The elimination of the separate seal of the cover plates simplifies manufacture and decreases the cost thereof. Additionally, the use of a single, unitary and continuous gasket enhances the sealing characteristics of the outlet such that it improves protection of the outlet box contents (i.e., the receptacle and wiring).

With the gasket apertures having transverse dimensions which are less than the transverse dimensions of the projections on the receptacle in the relaxed condition of the gasket, the portion of the gasket adjacent each aperture is deformed to provide the peripheral lip. Each peripheral lip surrounds each receptacle projection and extends through each cover plate opening upon assembly of the electrical outlet providing all the necessary seals in a single step by a single member. The planar form of the gasket permits the gasket to be die cut from sheet material, rather than be manufactured by a relatively expensive molding process.

Other objects, advantages and salient features of the present invention will become apparent from the following detailed description which, taken in conjunction with the annexed drawings, discloses a preferred embodiment of the present invention.

As used in this application, the terms "unitary" and "continuous" are intended to describe a member which is undivided and formed as a single piece, and which is not discontinuous.

BRIEF DESCRIPTION OF THE DRAWINGS

Referring to the drawings which form a part of this original disclosure.

DETAILED DESCRIPTION OF THE PREFERRED EMBODIMENT OF THE INVENTION

Figure 1:
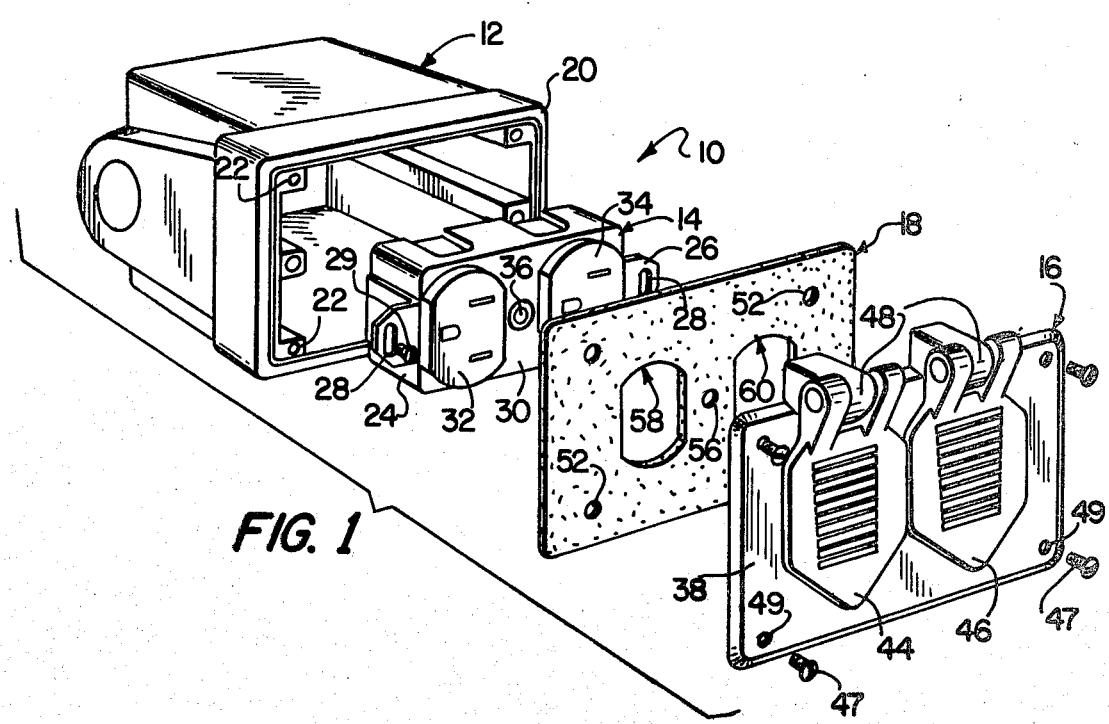
FIG. 1 is an exploded, perspective view of an electrical outlet with a gasket in accordance with the present invention.

Referring initially to FIG. 1, an electrical outlet 10 in accordance with the present invention, as illustrated, comprises an outlet box 12, an electrical receptacle 14, a cover plate 16 and a gasket 18. Since outlet box 12 and receptacle 14 are conventional and standard, these features will not be discussed in great detail.

Outlet box 12 is generally in the form of a hollow parallelepiped with an open front face 20. The four side and back walls of the outlet box can contain suitable openings and clamping devices for receiving multi-wire cables. The hollow interior of the outlet box houses receptacle 14 and the electrical wiring therefor. A plurality of bores 22 open on outlet box front face 20 and extend into the interior of the outlet box. The interiors of bores 22 are formed with suitable means for engaging a fastener, such as threads for engaging a screw.

Electrical receptacle 14 is of standard size and configuration for a duplex, grounded electrical outlet. The receptacle comprises a body 24 having a mounting strap 26 coupled thereto for securing the receptacle inside the hollow interior of outlet box 12. Strap 26 has openings 28 for receiving fasteners 29 which are then inserted in the respective bores 22 in the outlet box. Extending from the front face 30 of the receptacle are first and second projections 32,34 which surround the contact openings of the receptacle and which are spaced apart. A threaded bore 36 is formed between the projections which can receive a fastener for securing a cover plate. Suitable couplings are provided on receptacle body 24 to facilitate the connection of the wiring to the electrical receptacle.

Referring now to FIGS. 1, 3, 4 and 6, weatherproof cover plate 16 is generally of standard size and configuration for a duplex outlet. The cover plate comprises a plate member 38 having first and second openings 40,42 which are specially configured, sized and spaced to receive projections 32,34, respectively, of receptacle 14 with sufficient clearance to receive a portion of gasket 18 as explained in detail hereinafter. Typically, each opening has two opposite arcuate sections 40a,42a with a radius of curvature of about 0.680 inch, and with a maximum spacing of about 1.360 inches, and has two opposite straight line sections 40b,42b spaced apart about 1.150 inches. The opening centers are spaced apart about 1.531 inches.

Cover flaps 44,46 are coupled to plate member 38 by spring biased hinges 48 such that the flaps are positioned over the respective cover plate openings and are movable between open and closed positions. Each of the electrical projections 32,34 of receptacle 14 can be selectively exposed through the cover plate openings by manipulating cover flaps 44,46. On the internal surface of each cover flap, a circumferential flange 50 depends to assist in the sealing function. This flange 50 limits the pressure exerted upon the gasket lips by the spring-loaded cover flaps. It also serves to deflect water from the gasket itself. A plurality of fasteners 47 are received in through-bores or holes 49 in plate 16 to couple the plate to the box 12 via bores 22.

Figure 3:
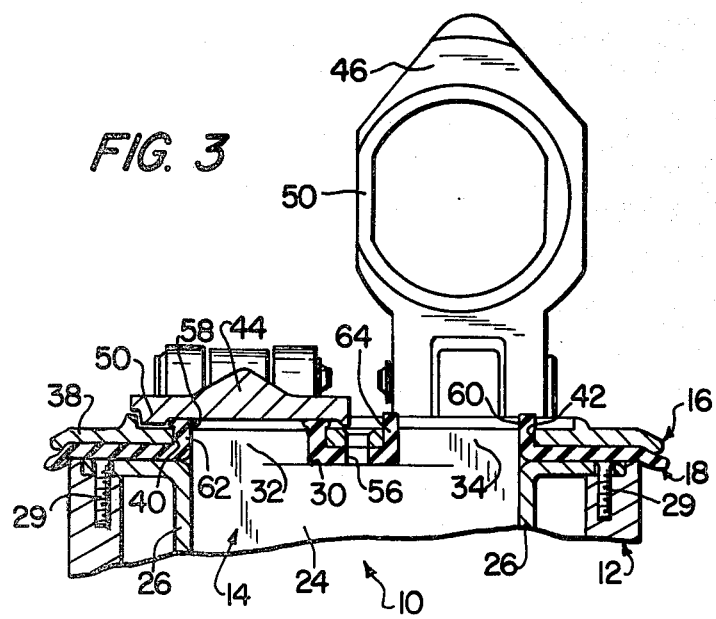
FIG. 3 is a partial, side elevational view in section of the electrical outlet of FIG. 1 when assembled.
Figure 2:
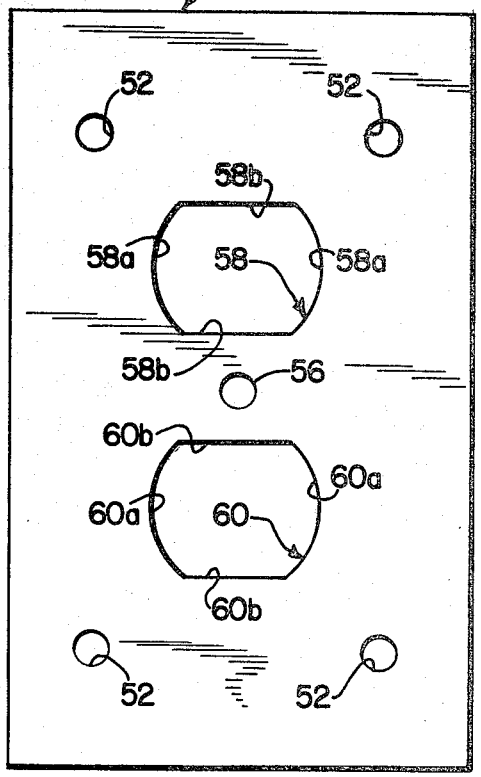
FIG. 2 is a top plan view of the gasket of FIG. 1.
Figure 4:
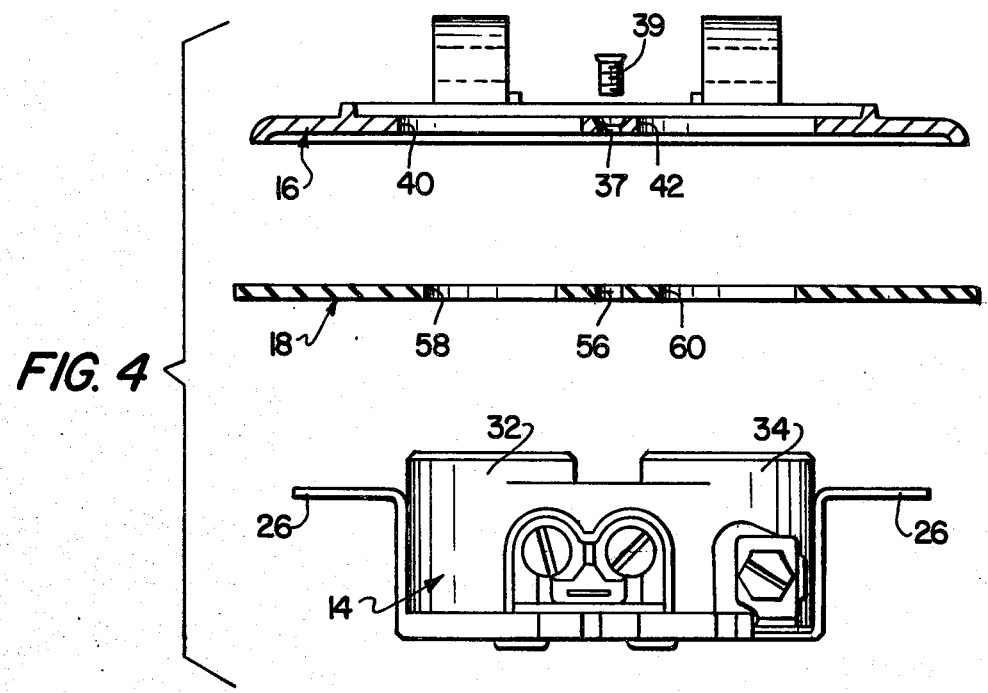
FIG. 4 is an exploded, side elevational view in section of the electrical outlet of FIG. 1 without the outlet box.

Referring now to FIGS. 1-4, with particular emphasis on FIG. 2, gasket 18 is illustrated in its relaxed or unstressed condition in FIGS. 1, 2 and 4, while being illustrated in its assembled or stressed condition in FIG. 3. The gasket, in its relaxed condition, comprises a generally plate-like or planar member formed of resilient, stretchable and flexible material, preferably closed cell foam (e.g., P-472E Epichlorohydrin obtainable from Rubatex Corporation of Bedford, Va.) and having a generally rectangular peripheral configuration corresponding to that of the standard duplex outlet box 12 and the duplex cover plate 16. The cover plate has four through-bores or holes 52 adjacent its corners which are aligned with the corner bores 22 in outlet box 12 when the electrical outlet 10 is assembled. A central through-bore or hole 56 is provided to be aligned with bore 36 in receptacle 14 to permit use of the gasket with a cover plate having a central opening or hole 37 to receive a fastener 39 threaded in bore 36 as seen in FIG. 4.

First and second apertures 58,60 extend through the planar member of gasket 18. Each of these gasket apertures has a configuration similar to, but smaller than, the configuration of projections 32,34 on receptacle 14 and openings 40,42 in cover plate 16. Specifically, the transverse dimensions in the relaxed condition of the gasket apertures are significantly less than the similarly viewed dimensions of projections 32,34 and openings 40,42. Gasket 18 is fixedly attached to the inner surface of cover plate 16 by a suitable adhesive such that the respective apertures 58,60 and openings 40,42 and the respective bores 52 and 49 are coaxially aligned.

In assembling the electrical outlet 10, electrical receptacle 14 is mounted within outlet box 12 in a conventional manner with fasteners 29 received in the openings 28 in mounting strap 26 and respective bores in box 12. Thereafter, cover plate 16 with gasket 28 adhered thereto is placed over the receptacle and the box with the respective bores 49,52 and 22 aligned. Fasteners 47 are then passed through the aligned bores in the cover plate and gasket, and threaded in respective bores 22.

As cover plate 16 is secured in position, the portions of the gasket adjacent apertures 58,60 are deformed to provide peripheral lips or flanges 62,64 as illustrated in FIG. 3. Lips 62,64 are formed around gasket apertures 58,60, respectively, and extend through openings 40,42, respectively in cover plate 16. The peripheral lips extend upwardly from the remainder of the gasket such that the lips surround, in interference fits, projections 32,34 on receptacle 14 and the inner edges of cover plate openings 40,42. The interior surface of flaps 44,46 within peripheral flanges 50, as illustrated in the left hand portion of FIG. 3, contact the top edges of the peripheral flanges in the closed position of the flaps.

Typically, each aperture has two opposite arcuate sections 58a,60a with a radius of curvature of about 0.531 inch and with a maximum spacing of about 1.062 inches, and has two opposite straight line sections 58b,60b spaced apart about 0.850 inch. The aperture centers are spaced apart about 1.531 inches. The thickness of the gasket is 0.100 inch with a tolerance of plus or minus 0.015 inch. If the gasket thickness is too large, the portion of the gasket adjacent the apertures will not form peripheral lips 62,64 of the proper height. If the gasket is too thin, the peripheral lips 62,64 will be initially formed to the proper height, but will creep or recede back to their original, flat positions.

Figure 5:
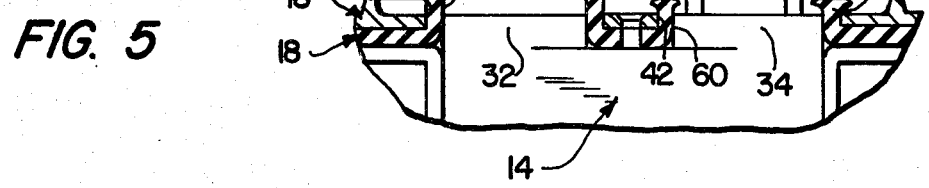
FIG. 5 is a partial, side elevational view in section of the electrical outlet of FIG. 1 with plugs of different sizes connected thereto and without the cover flaps.
Figure 6:
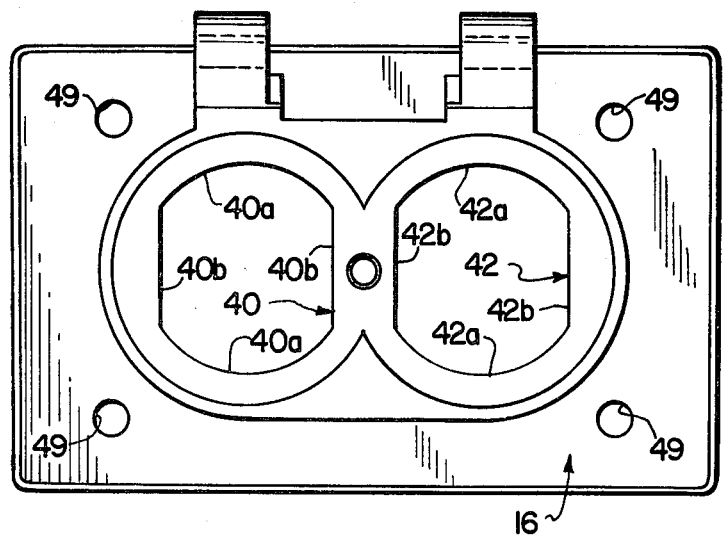
FIG. 6 is a top plan view of the cover plate of FIG. 1 without the cover flaps.

The single, unitary, continuous gasket 18 forms all of the necessary seals for the outlet box, i.e., between the box and the cover plate, between the receptacle and the cover plate, and between the cover flaps or plugs and the cover plate. The seal between the outlet box and the cover plate is provided between the adjacent peripheral portions of the outlet box, gasket and cover plate. The seal between the receptacle and the cover plate is provided by peripheral lips 62,64 which are sandwiched in interference fits between cover plate openings 40,42 and projections 32,34, respectively. The seal between the flaps and the cover plate is also provided by the gasket peripheral lips 62,64 when the flaps, in their closed positions, contact and press down upon the top surfaces of the peripheral lips. The seal between a plug and the cover is also provided by peripheral lips 62,64. As illustrated in FIG. 5, a relatively small plug 66 is sealed by contacting the inner surface of peripheral lip 62 with the plug outer surface, while a relatively large plug 68 is sealed by contacting the upper surface of peripheral lip 64 with the plug front face and compressing lip 64, to form a seal about the plug prongs provided the plug face has a surface area at least as large as the area circumscribed by the sealing lips.

Figure 7:
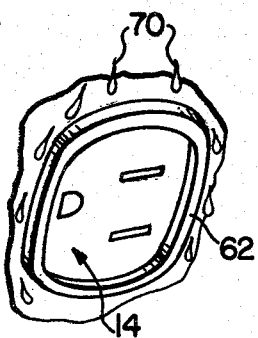
FIG. 7 is a partial, perspective view of the electrical outlet of FIG. 1 when assembled.

Even with the cover flaps open and the receptacle exposed, the peripheral lips provide some protection from contaminant leakage. As illustrated in FIG. 7, lip 62 will divert and channel drops 70 of water (e.g. from rain or sprinkler spray) running down the exposed face of the cover plate away from the receptacle.

Since only a single gasket is employed in the electrical outlet, both manufacture and assembly of the gasket are facilitated. The assembly is particularly simplified since the gasket is so arranged that the seals between the receptacle and cover plate and for the flaps and plugs are automatically formed in assembling the outlet, without the need for additional gasket members. Since the gasket is unitary, there are less gaps in the electrical outlet, thereby decreasing the chance of contaminant leakage into the electrical outlet and enhancing the weatherproof capabilities of the outlet.

The formation of the gasket with undersized apertures 58,62, i.e., apertures having transverse dimensions less than those of the projections on a standard duplex electrical receptacle and those of the openings in the duplex cover plate, produces the peripheral lips or flanges automatically upon assembly of the outlet. These peripheral lips eliminate the extra seals required in conventional outlets for the cover flaps. Additionally, the formation of the peripheral lips automatically upon assembly of the outlet, permits the gasket to be inexpensively manufactured by being die cut or stamped from sheet material. Such manufacturing process is much less expensive than molding the gasket with preformed raised peripheral lips about its apertures.

While a particular embodiment has been chosen to illustrate the invention, it will be understood by those skilled in this art that various changes can be made therein without departing from the scope of the invention as defined in the appended claims.

What is claimed is:

1. An electrical outlet, comprising:
    an outlet box;
    an electrical receptacle mounted in said outlet box and having a projection;
    a cover plate extending over said receptacle and box and having a first access opening therein exposing said receptacle and receiving said projection therein;
    a first flap coupled to said cover plate, said flap being movable between an open position and a closed position in which it is positioned over said opening; and
    a unitary, continuous gasket received between said cover plate and said receptacle and between said cover plate and said outlet box, said gasket comprising a generally planar member formed of resilient material, said planar member having a peripheral configuration generally corresponding to the peripheral configurations of said outlet box and cover plate and having a first aperture extending therethrough,
    said first aperture having transverse dimensions in a relaxed condition of said gasket less than the transverse dimensions of said receptacle projection such that when said receptacle projection is forced into said cover plate opening and said gasket aperture, a portion of said gasket adjacent said aperture is stretched and deformed out of the plane of said gasket to form a first peripheral lip surrounding said gasket aperture and said receptacle projection, extending through said cover plate opening and contacting said flap in its closed position;

whereby said gasket forms seals between said box and cover plate, said receptacle and cover plate, and said cover plate and said flap or a plug coupled to said receptacle.

2. An electrical outlet according to claim 1 wherein said cover plate has a second opening therein and a second flap coupled thereto, positioned over said second opening and movable between open and closed positions; said receptacle has a second projection; and said gasket has a second aperture extending therethrough, said second aperture having transverse dimensions in a relaxed condition of said gasket less than the transverse dimensions of said receptacle second projection such that when said second projection is forced into said cover plate second opening and said gasket second aperture, a portion of said gasket adjacent said second aperture is stretched and deformed out of the plane of said gasket to form a second peripheral lip surrounding said second aperture and said receptacle second projection and extending through said cover plate second opening, said second lip contacting said second flap in said closed position thereof.

3. An electrical outlet according to claim 2 wherein said cover plate has a first central hole between said first and second openings; said gasket has a second central hole between said first and second apertures; said receptacle has an internally threaded bore between said first and second projections; and a screw passes through said first and second central holes and threadedly engages said internally threaded bore securing said cover plate to said receptacle, and thereby to said outlet box.

4. An electrical outlet according to claim 1 wherein said first peripheral lip of said gasket engages said first opening of said cover plate in an interference fit.

5. An electrical outlet according to claim 1 wherein said gasket is die cut from a sheet of resilient material.

6. An electrical outlet according to claim 1 wherein said gasket is adhered to an inner surface of said cover plate.

7. An electrical outlet according to claim 1 wherein said gasket is formed of closed cell foam.

8. An electrical outlet according to claim 1 wherein said gasket has a thickness of about 0.100 inch.

9. An electrical outlet according to claim 1 wherein said gasket has a thickness in the range of 0.085 to 0.115 inch.

10. An electrical outlet according to claim 1 wherein said gasket aperture has two opposite arcuate sections with a radius of curvature of about 0.531 inch and with a maximum spacing of about 1.062 inches, and has two opposite straight line sections spaced apart about 0.850 inch.

11. An electrical outlet according to claim 1 wherein said cover plate opening has two opposite arcuate sections with a radius of curvature of about 0.680 inch and with a maximum spacing of about 1.360 inches, and has two opposite straight line sections spaced apart about 1.150 inches.

12. A unitary, continuous gasket for sealing an electrical outlet, comprising:

a generally planar member formed of resilient material having a peripheral configuration corresponding to peripheral configurations of standard duplex outlet boxes and cover plates therefor; and first and second apertures extending through said planar member, each of said apertures having two opposite arcuate sections with a radius of curvature of about 0.531 inch and with a maximum spacing of about 1.062 inches, and having two opposite straight line sections spaced apart about 0.850 inch, such that portions of said gasket adjacent said apertures are stretched and deformed out of the plane of said gasket to provide peripheral lips about said aperture which surround the receptacle projection and extend through said cover plate openings upon assembly in an electrical outlet;

whereby said gasket forms seals between the box and cover plate, between the receptacle and cover plate, and between the cover plate and flaps on the cover plate or a plug connected to the receptacle.

13. A gasket according to claim 12 wherein said gasket is die cut from a sheet of resilient material.

14. A gasket according to claim 12 wherein said gasket is formed of closed cell foam.

15. A gasket according to claim 12 wherein said gasket has a thickness of about 0.100 inch.

16. A gasket according to claim 12 wherein said gasket has a thickness in the range of 0.085 to 0.115 inch.

17. An improved weatherproof electrical outlet assembly of the type having an outlet box with an open front, a receptacle having a projection mounted in the box, a cover plate closing the front of the box, at least one access opening through the cover plate to permit access to electrical contacts in the receptacle and to receive the receptacle projection, and cover means for selectively closing the access opening, wherein the improvement comprises:

a unitary, continuous gasket received between said cover plate and said receptacle and between said cover plate and said outlet box, said gasket comprising a generally planar member formed of resilient material, said planar member having a peripheral configuration generally corresponding to the peripheral configurations of said outlet box and cover plate and having a first aperture extending therethrough, said first aperture having transverse dimensions in a relaxed condition of said gasket less than the transverse dimensions of said receptacle projection such that when said receptacle projection is forced into said cover plate opening and said gasket aperture, a portion of said gasket adjacent said aperture is stretched and deformed out of the plane of said gasket to form a first peripheral lip extending through said cover plate access opening and contacting said flap in its closed position;

whereby said gasket forms seals between said box and cover plate, said receptacle and cover plate, and said cover plate and said flap or a plug connected to the receptacle.

18. An electrical outlet, comprising:
an outlet box;
an electrical receptacle mounted in said outlet box and having a projection;
a cover plate extending over said receptacle and box, and having a first access opening therein exposing said receptacle and receiving said projection therein; and a unitary, continuous gasket received between said cover plate and said receptacle and between said cover plate and said outlet box, said gasket comprising a generally planar member formed of resilient material, said planar member having a peripheral configuration generally corresponding to the peripheral configurations of said outlet box and cover plate and having a first aperture extending therethrough;

said first aperture having transverse dimensions in a relaxed condition of said gasket less than the transverse dimensions of said receptacle projection such that when said receptacle projection is forced into said cover plate opening and said gasket aperture, a portion of said gasket adjacent said aperture is stretched and deformed out of the plane of said gasket to form a first peripheral lip surrounding said gasket aperture and said receptacle projection and extending through said cover plate opening;

whereby said gasket forms seals between said box and cover plate, said receptacle and cover plate, and said cover plate and a plug coupled to said receptacle.

19. An electrical outlet according to claim 18 wherein said cover plate has a second opening therein; said receptacle has a second projection; and said gasket has a second aperture extending therethrough, said second aperture having transverse dimensions in a relaxed condition of said gasket less than the transverse dimensions of said receptacle second projection such that when said second projection is forced into said cover plate second opening and said gasket second aperture, a portion of said gasket adjacent said second aperture is stretched and deformed out of the plane of said gasket to form a second peripheral lip surrounding said second aperture and said receptacle second projection and extending through said cover plate second opening.

20. An electrical outlet according to claim 19 wherein said cover plate has a first central hole between said first and second openings; said gasket has a second central hole between said first and second apertures; said receptacle has an internally threaded bore between said first and second projections; and a screw passes through said first and second central holes and threadedly engages said internally threaded bore securing said cover plate to said receptacle, and thereby to said outlet box.

21. An electrical outlet according to claim 18 wherein said first peripheral lip of said gasket engages said first opening of said cover plate in an interference fit.

22. An electrical outlet according to claim 18 wherein said gasket is die cut from a sheet of resilient material.

23. An electrical outlet according to claim 18 wherein said gasket is adhered to an inner surface of said cover plate.

24. An electrical outlet according to claim 18 wherein said gasket is formed of closed cell foam.

25. An electrical outlet according to claim 18 wherein said gasket has a thickness of about 0.100 inch.

26. An electrical outlet according to claim 18 wherein said gasket has a thickness in the range of 0.085 to 0.115 inch.

27. An electrical outlet according to claim 18 wherein said gasket aperture has two opposite arcuate sections with a radius of curvature of about 0.531 inch and with a maximum spacing of about 1.062 inches, and has two opposite straight line sections spaced apart about 0.850 inch.

28. An electrical outlet according to claim 18 wherein said cover plate opening has two opposite arcuate sections with a radius of curvature of about 0.068 inch and with a maximum spacing of about 1.360 inches, and has two opposite straight line sections spaced apart about 1.150 inches.

* * * * *